United States Patent [19]
Siitonen et al.

[11] Patent Number: 6,049,796
[45] Date of Patent: *Apr. 11, 2000

[54] PERSONAL DIGITAL ASSISTANT WITH REAL TIME SEARCH CAPABILITY

[75] Inventors: Lasse Siitonen, Jankanraitti; Risto Ronkka, Koulukatu, both of Finland

[73] Assignee: Nokia Mobile Phones Limited, Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,814

[22] Filed: Feb. 24, 1997

[51] Int. Cl.[7] .................................................... G06F 17/00
[52] U.S. Cl. ........................ 707/3; 707/5; 707/4; 707/102
[58] Field of Search .................... 340/825.44; 707/1–206

[56] References Cited

U.S. PATENT DOCUMENTS

| | | | |
|---|---|---|---|
| 4,453,217 | 6/1984 | Boivie | 364/300 |
| 5,189,632 | 2/1993 | Paajanen et al. | 364/705.05 |
| 5,267,308 | 11/1993 | Jokinen et al. | 379/354 |
| 5,604,492 | 2/1997 | Abdul-Halim | 340/825.44 |
| 5,675,324 | 10/1997 | Hashimoto et al. | 340/825.44 |
| 5,689,547 | 11/1997 | Molne | 379/58 |
| 5,715,395 | 2/1998 | Brabson et al. | 395/200.13 |

OTHER PUBLICATIONS

Owner's Manual EC–359, "128K Electronic Organizer with Icon Menu Selection and Expense Manager", Tandy Corporation, 1995, pp. 2–3, 22–27.

*Primary Examiner*—Wayne Amsbury
*Assistant Examiner*—David Yiuk Jung
*Attorney, Agent, or Firm*—Perman & Green, LLP

[57] ABSTRACT

The present invention is a method and an apparatus for searching a personal digital assistant (PDA) data base utilizing a search criteria and displaying the result so that the user can determine whether the search yielded the intended result, whether the search needs to be refined, or whether the outcome should be used to initiate an electronic communication such as a telephone call. After successfully obtaining the specific name and recipient information, such as a telephone number, telefax number, numbers for an Internet server and related E-mail address, the numbers may be applied to a telephone for establishing a PSTN or telephone connection. Thereafter the PDA, utilizing the telephone unit links the user to a line or employs data transmission capabilities of a wireless network to send telefaxes, short messages, E-mail and to connect with remote computers. Using a keyboard the user can store data in a data base, alter the data base and input search criteria. The directory is similar in appearance to a telephone book listing where the information comprises at least a name and telephone number or address associated with a particular field in a data base record. Because names are primarily what interests the personal digital assistant users, searches based on the name field typically yields related phone numbers and other record data, although the user is not precluded from searching on other types of information.

29 Claims, 14 Drawing Sheets

PERSONAL DIGITAL ASSISTANT WITH REAL TIME SEARCH CAPABILITY

FIELD OF THE INVENTION

The present invention relates to the field of data base searching used in connection with personal digital assistants and electronic communications.

BACKGROUND OF THE INVENTION

Advanced communications systems have brought portable radiotelephony to countless subscribers throughout the world by combining many technologies such as high frequency semiconductors, computer and communications technology. As the technology matures it opens opportunities for expanded services such as personal digital assistants.

The personal digital assistant (PDA) is essentially a portable electronic computer having specialized capabilities. The PDA comes in several varieties such as message pads, palm top computers and those that combine PDA's with communications units. Generally, PDA's do not have self contained phone units, however, a user may still send telefaxes, electronic mail(E-mail), voice mail and voice telephone calls. Some PDA's can be directly connected to a the Public Switched Telephone Network(PSTN) whereas others may require an adapter such as a PCMCIA card. It is a common practice to include features such as calculators, calendars, memorandum pads and personal and business directories or calling card file information. PDA's that contain such information utilize conventional computer storage facilities and retain such information in non-volatile memory storage devices such as random access memory, tape storage, and magnetic disk storage.

Regardless of the particular data storage technology, the information is accessible to the user of the PDA's through conventional display technology, such as a liquid crystal display. The personal and business information contained often includes such information as individual names, company names, addresses, telephone numbers, telefax numbers, E-mail addresses and other wide ranging information.

Through advances in storage technology, PDA users compile ever increasingly more information imposing requirements to retrieve specific information rapidly and accurately. However, simply increasing electronic processor speed often taxes available power sources, but, because the devices are required to be small enough to be portable, large power supplies are not feasible. This dual need challenges the designer of this technology to strive for innovative methods for producing the required searches efficiently which calls for improving computer data base search techniques.

A PDA may contain memory storage devices to permit the creation of data bases used in various PDA and telephone applications. For example, the data base may hold contact information, similar to a calling card, such as telephone numbers and addresses. This contact information may be used by the telephone to initiate a telephone call, telefax or E-mail transmission. The PDA can then send and receive message content contained within mediums such as the telefaxes or E-mail and serve as an adjunct to the telephone to provide speakerphone or voice mail capability. As the number of contact entries becomes large it becomes necessary, for practical reasons, to incorporate methods to search the data bases for information the user needs to retrieve.

To accomplish a search the PDA would have to incorporate software or firmware to properly interpret the search commands, carry out a search algorithm, and display lists of records that meet the search specification. Such methods are generally well known by those person skilled in the computer arts.

For smaller data bases such as are utilized in PDA applications, the approach has been to provide a simple search, where the user activates the search function and types in the search key or designator. The search is performed after the user activates the search by, for example, pressing a key such as enter or a specific 'search' key. This is referred to as a 'passive search' and is characterized by the fact that it does not display the result of the query as soon as the query search key activates the search.

SUMMARY OF THE INVENTION

The present invention is an apparatus and a method for searching a PDA data base utilizing a search criteria and displaying the result so that the user can determine whether the search yielded the intended result, whether the search needs to be refined, or whether the outcome should be used to initiate a telephone call. After successfully obtaining a specific name and a corresponding calling number, such as a telephone number, a telefax number, or numbers for an Internet server and/or an E-mail address, the numbers are applied to a telephone for establishing a telephone connection. Thereafter, the PDA, utilizing the telephone, links the user to a PSTN or employs available data transmission capabilities of the wireless network to send telefaxes, short messages, E-mail, or to connect with remote computers.

In carrying out the invention, a search engine or search application program resident in the PDA memory or firmware cooperates with the PDA, which contains a display for displaying the database information. It also includes an input device such as a keypad, touch screen, or keyboard (referred to collectively as a keyboard), to allow the user to store data and retrieve data in a database, or alter the database, or input various search criteria.

The data base, generally analogized to a telephone book, is referred to as a contact data base where data stored in fields comprises at least a name associated with a particular field in a data base record. Other fields contain addresses, telephone and facsimile numbers, E-mail and paging addresses, Internet universal resource locator numbers, and any other types of calling numbers associated with electronic communications. Because names are primarily what interests the PDA users, the user generally searches the name field, although the user is not precluded from searching other fields such as address fields. The contact data base is also used to select addressees for facsimiles and E-mails as well as to route telephone calls.

As the user types in the search key, the PDA virtually instantly displays the items matching the search found in the contact data base. The user can refine the search by adding additional search criteria until finally producing for viewing a minimum number of data base records matching the search criteria. For example, if the user types the letter "j" all records having names beginning with the letter "j" appear. The user may continue to type additional letters defining a name, for example, the pair of letters "on" chooses records such as "Jones" but not records such as "Jackson". Further typing the letter "a" would eliminate "Jones" as a possibility and display any names having as their first four letters "jona" such as "Jonathan". This method of searching is referred to as an active search, and is distinguished from a passive search where the search begins only after the search key has been entered, the search function actuated, and a completed compilation produced.

A PDA capable of carrying out the objects of the invention is comprised of a storage device containing a data base with one or more records of names and relatable calling numbers; a directory relatable to said records; an input device for inputting a search key relatable to a data element in one or more of the records; a search engine to search the data base and compare the records to the search key; and a display for showing the directory of those records that compare to the search key. The input device selects a calling record in the directory in accordance with the location of an indicator on a display, denoted by a cursor, pointing device or physical contact such as touching a touch screen in addition to a selection frame in the display. An electronic communications device such as a telephone connected to the personal digital assistant may then initiate one or more applications relatable to the communication of a message content based on a description of the record selected.

A method of operation of the PDA as disclosed herein employs an input device such as a keyboard, telephone keypad, or touch screen, a file storage device such a magnetic disk storage or semiconductor memory, a data base, a search engine, a display and a telephone connection. Thereafter the steps required to implement the method include storing in the data base one or more file records containing personal and business records containing names and calling numbers; choosing from the stored file records a directory to display searchable data contained in the data base; inputting a search key relatable to a data element in one or more file records; comparing the search key to the data in the file records and displaying in the directory one or more file records in which the data element matches the search key; selecting a file record in accordance with the location of an indicator on a display, denoted by at least one of a cursor, a pointing device or a contact and a selection frame in the display; and finally utilizing the calling number found in the selected file record to initiate an electronic communication to transmit a message content contained within mediums such as a facsimile, E-mail, paging message or voice telephone call.

An object of this invention is to provide an efficient method for searching a PDA database.

A second object of this invention is to provide a method whereby a PDA searches a data base for pertinent calling numbers and initiates a telephone call utilizing the numbers.

Another object of this invention is to provide a PDA capable of searching a database for pertinent calling numbers and initiating a telephone call utilizing the numbers.

BRIEF DESCRIPTION OF THE DRAWINGS

The novel features of the present invention are set forth with particularity in the appended claims. The invention itself, however, both as to its organization and method of operation, together with further objects and advantages thereof, may be best understood by reference to the following description taken in conjunction with the accompanying drawings, in which:

DESCRIPTION OF THE PREFERRED EMBODIMENT

Figure 1:
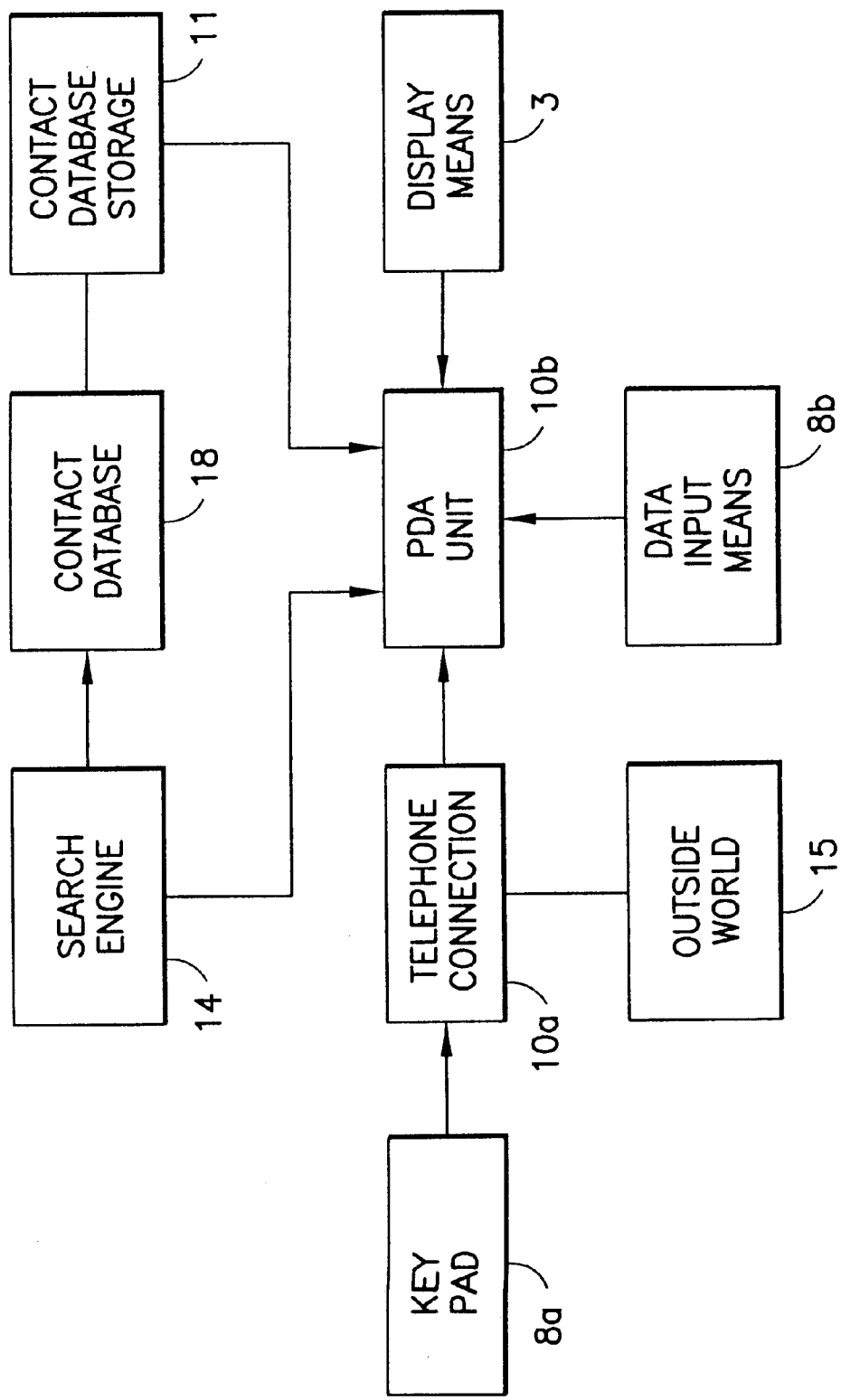
FIG. 1 is a high-level diagram of a PDA.

FIG. 1 is a high-level diagram of a PDA 10 that includes a PDA unit 10b having one or more data input devices 8a and 8b, a contact data base storage unit 11, a contact data base 18, a search engine 14, a display 3 and a device or interface for electronic communication, such as a telephone unit connection 10a.

FIG. 1, blocks 11, 14 and 18 and associated arrows represent functions of the process according to the present invention which may be implemented as electrical circuits and associated wires or data busses, which transport electrical signals. Alternatively, one or more associated arrows may represent communication (e.g., data flow) between software routines, particularly when the present method or apparatus of the present invention is implemented as a digital process as in the preferred embodiment.

Figure 2A:
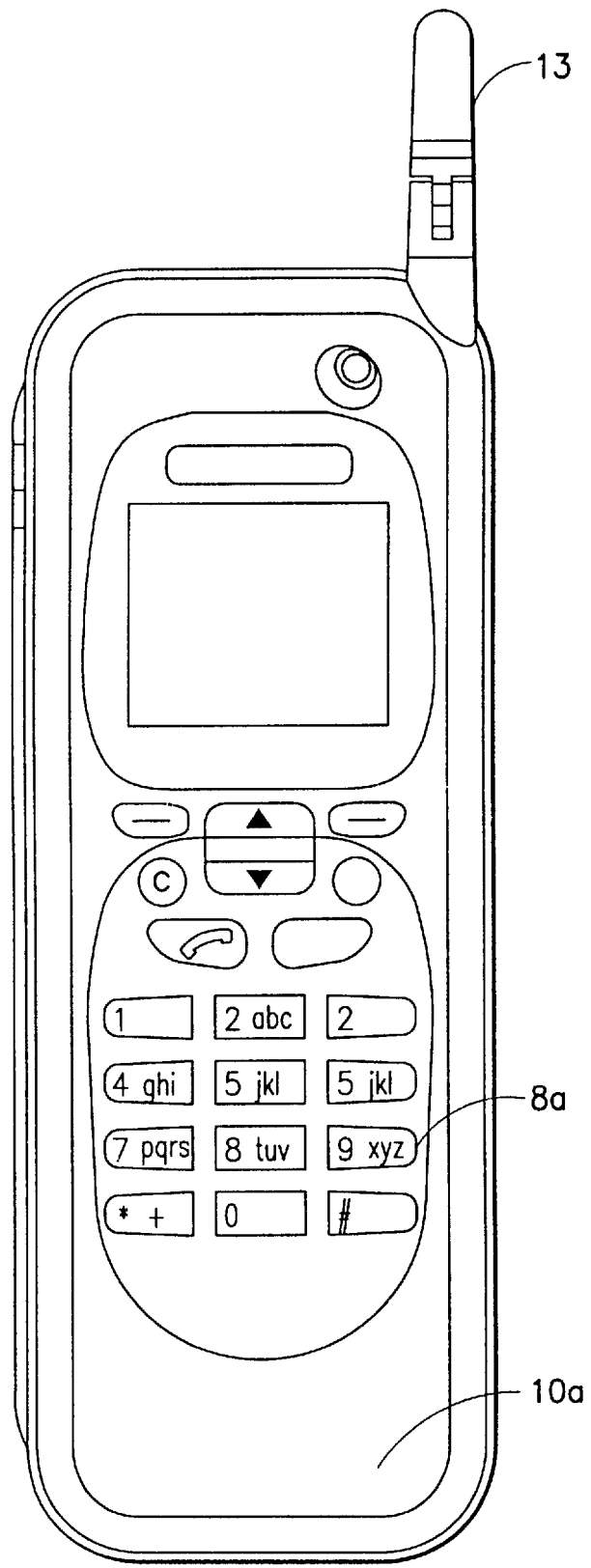
FIG. 2A is a frontal view of a telephone unit utilized with a PDA.
Figure 2B:
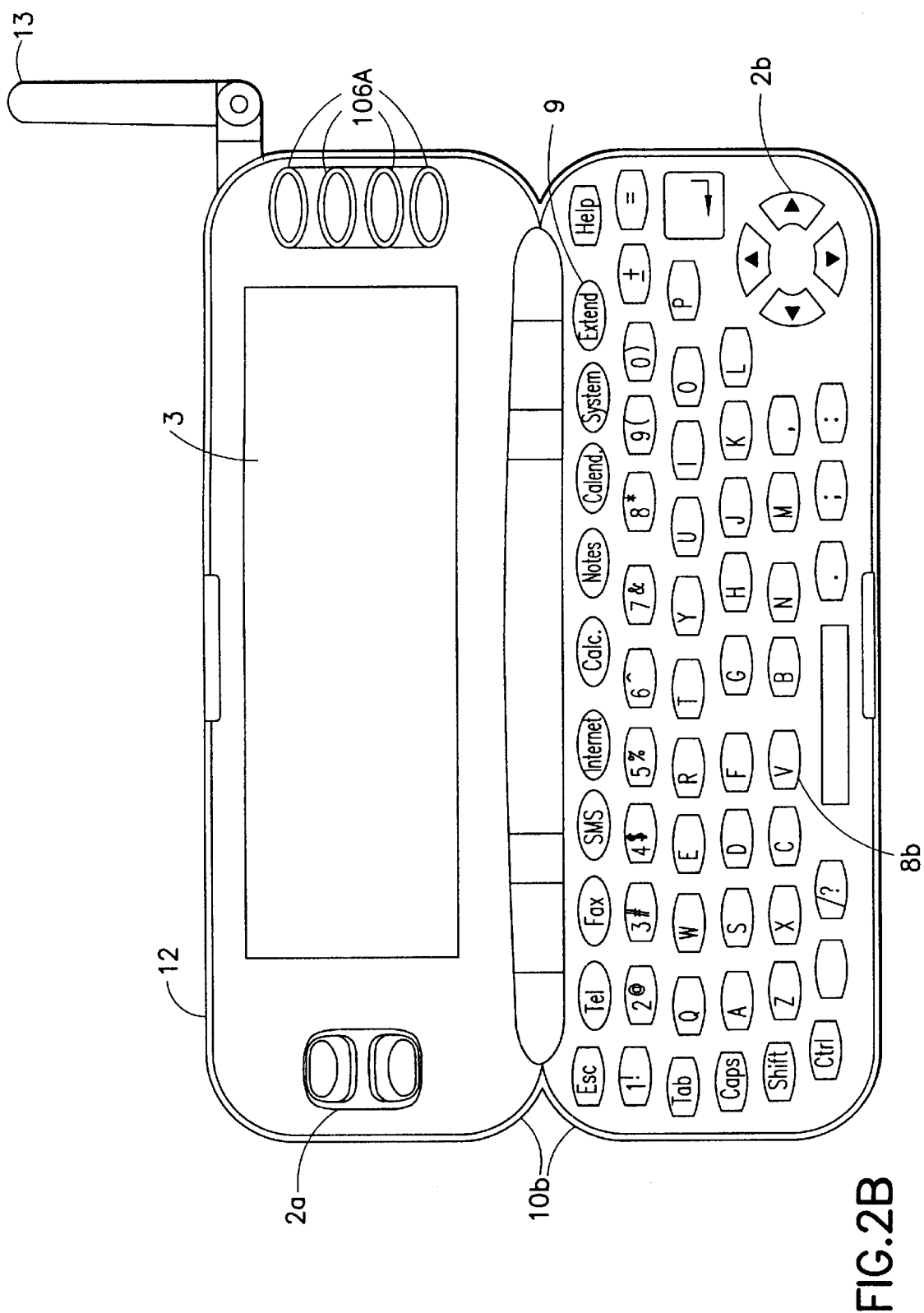
FIG. 2B is a perspective view of a PDA unit utilized with the cellular telephone in FIG. 2A.

Referring to FIGS. 2A and 2B, in a presently preferred embodiment the PDA is comprised of the telephone unit 10a and the PDA unit 10b. The telephone unit 10a electrically and mechanically interfaces to the PDA unit 10b on an unshown face of PDA hinged cover 12. In one mode of operation the cover 12 closes the PDA display 3 and keyboard 8b, but the fully integrated telephone unit 10a attached to the cover 12 also permits electronic access to certain functions of the PDA unit 10b, such as its data base through the keypad 8a. The "interface" emphasizes the fact that the telephone unit 10a and the PDA unit 10b use the same resources and essentially cooperate as one device. For example, the telephone unit 10a may use names and phone numbers stored in the data base storage unit 11 to initiate voice telephone calls, sending or receiving telefaxes, or connecting to remote computers. The PDA unit 10b also uses the interface and employs data transmission capabilities compatible with existing wireless networks for communicating with the outside world 15, i.e. for sending or receiving telefaxes and connecting to remote computers.

Although shown in FIGS. 2A and 2B as an integrated phone/PDA unit, in other embodiments of the invention the PDA 10 may have a connector for plugging into a telephone line, or to connect to a separate wireless communicator, such as a cellular telephone.

Figure 3:
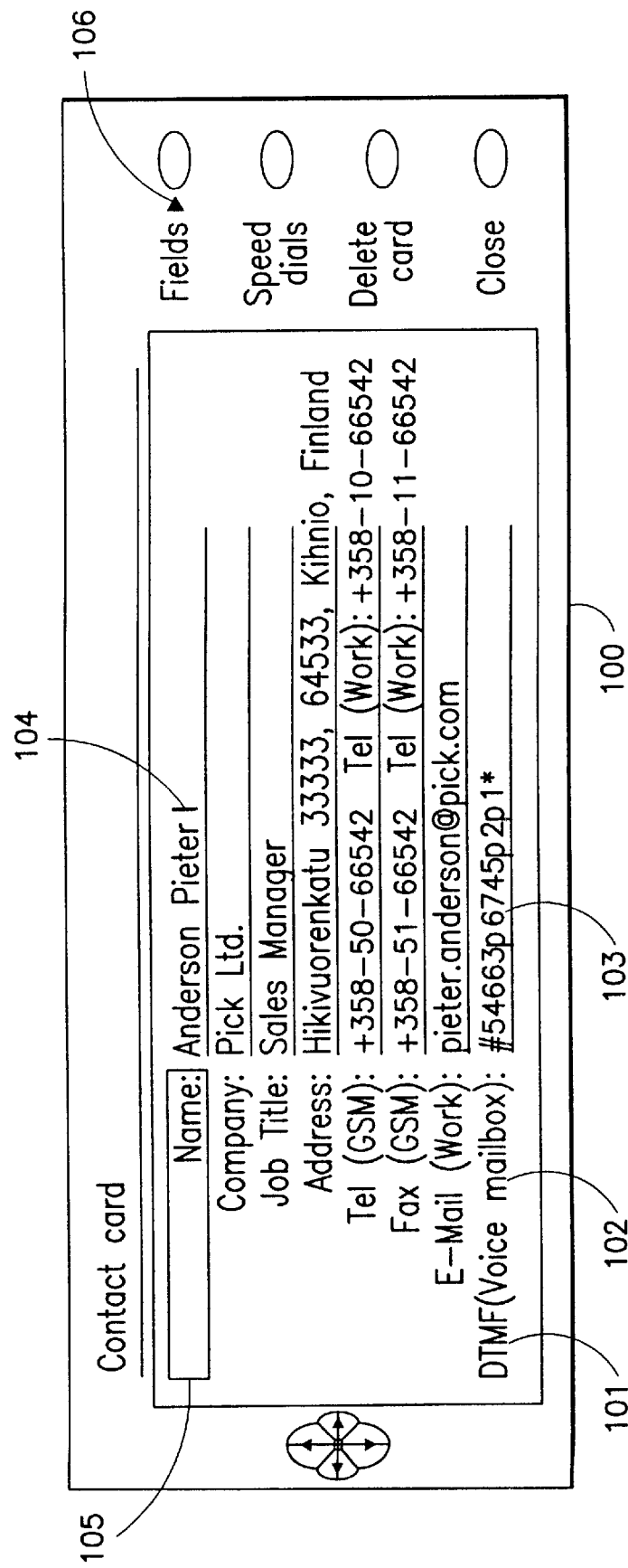
FIG. 3 illustrates a contact card containing the information that is typically summarized for displaying in various directories.

The contact data base 18 contains information as illustrated on an exemplary contact card 100 in FIG. 3, constituting business and personal information such as names, addresses, phone numbers, E-mail addresses, and telefax calling numbers. Referring to FIG. 3 the structure of the contact card 100 is comprised of a field ID 101 and a field ID 102 and values, such as a value 103, for illustration. Other items that are typically found in the contact card 100 and related cards, to be described hereinafter, are a cursor 104, a selection frame 105 and an indicator of available options 106.

Figure 4A:
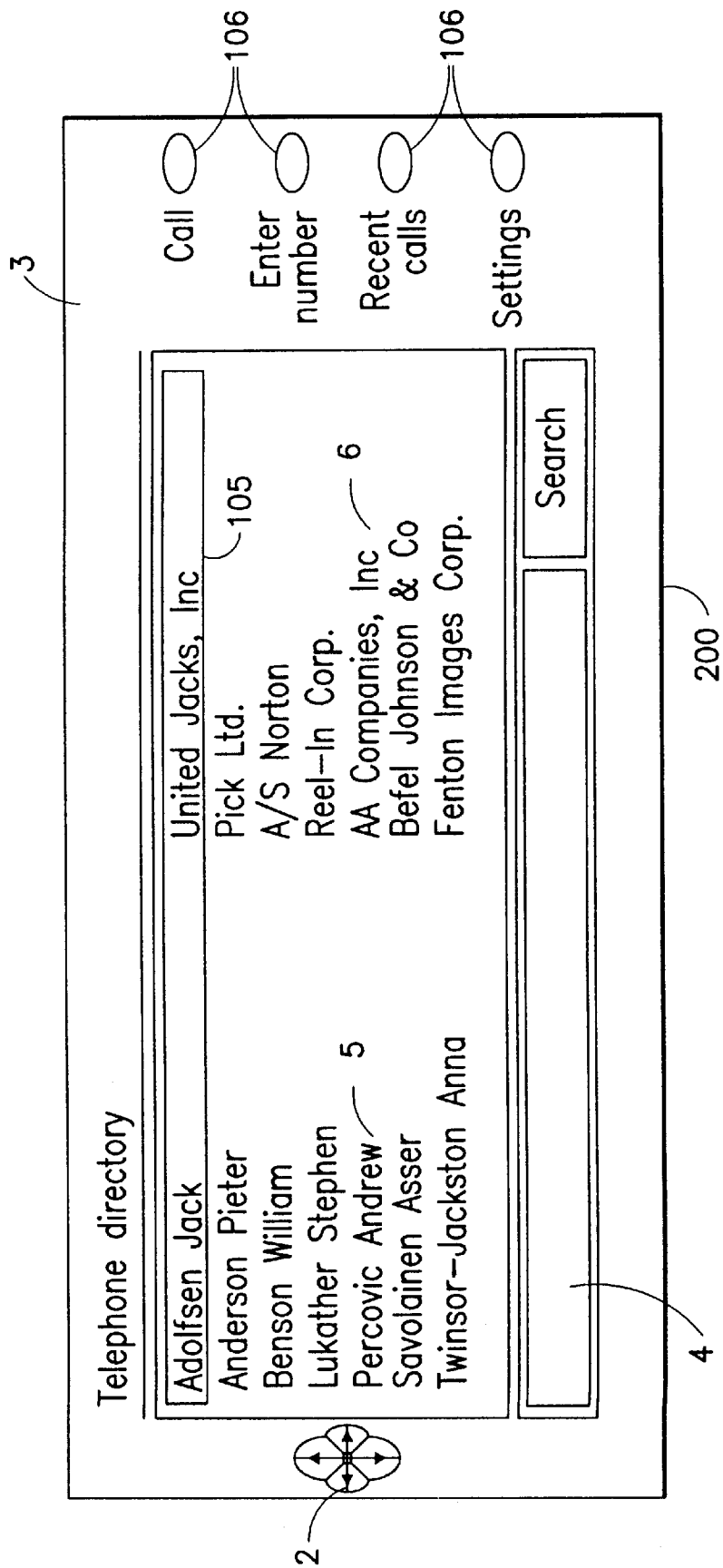
FIGS. 4A–4D illustrate various displays of the telephone directory.

The contact data base 18 contains the information retrievable by the PDA 10b in performing each of its intended functions. For example, the PDA 10b will display in display 3 various application directories derived from the contact data base 18 such as a telephone directory 200 (FIG. 4A), a telefax directory 300 (FIG. 5A), or E-mail directory 400 (FIG. 5B). The PDA 10b (also referred to as a control means) will also display the results of a contact data base 18 search after utilizing the search engine 14 to perform a search on the basis of a search key 21 input. Essentially, the specific information displayed depends on the information the selected user application requires. For example, when making a call via the telephone, the name and the phone numbers of the contact are displayed on display 3. Other information such as possible telefax numbers, E-mail addresses and job titles may not be shown at that time.

In an alternate mode of operation the user can input through the telephone unit 10a keypad 8a a searchable alphanumeric string of characters. By appropriate key selection, the PDA 10b will search its data base and provide information to the telephone unit 10a for establishing a communication link to the outside world 15 through a direct connection to a PSTN or the wireless network via antenna 13.

The contact application is used to create, edit, delete and manage all information, such as phone numbers and address data. This contact information is used by the telephone 10b in the telephone, telefax, and E-mail applications. The contact directory, unshown, is a list of all contact cards where each contact card 100 can be created, edited, or deleted. In the contact's directory each contact card is listed in alphabetical order according to the name in each contact card 100, as indicated by the Name field ID 101.

Referring to FIG. 2B, the user typically chooses the application or function to be performed by the PDA 10b by pressing one of several application keys 9. In the case where a telephone call is to be made, depressing the telephone key of the application keys 9 produces a telephone directory display. The display 3 then indicates which selection, such as the contact directory, telephone directory 200, telefax directory 300 or E-mail directory 400, has been chosen. Each directory operates in essentially the same manner.

The PDA 10b contains, in addition to the application keys 9, a QWERTY standard keyboard 8b for inputting and editing contact information, and navigation keys 2a and 2b for controlling the display selection. In an alternate embodiment the keyboard is replaced by a touch screen with all the same functions that are hereinafter described for the standard keyboard 8b. In another embodiment a voice recognition function can be used to replace or supplement the manual data entry device, such as the keyboard 8b. In FIG. 4A the display option 106, adjacent to option keys 106A (FIG. 2) permits each directory to be utilized in carrying out the specific function. Each directory will display a different set of options 106. For example, the telephone directory 200 would depict in its display, Call, Enter Number, Recent Calls, and Settings, pertaining to a call to be placed, telephone numbers to be entered manually, a display of recent calls and special telephone feature settings, respectively.

Whenever an application directory, such as the telephone directory 200 is chosen by the user, the information (also referred to as one or more entries) can be highlighted on the display screen 3 by scrolling or moving the selection frame 105 with the navigation keys 2a or 2b.

Figure 4B:
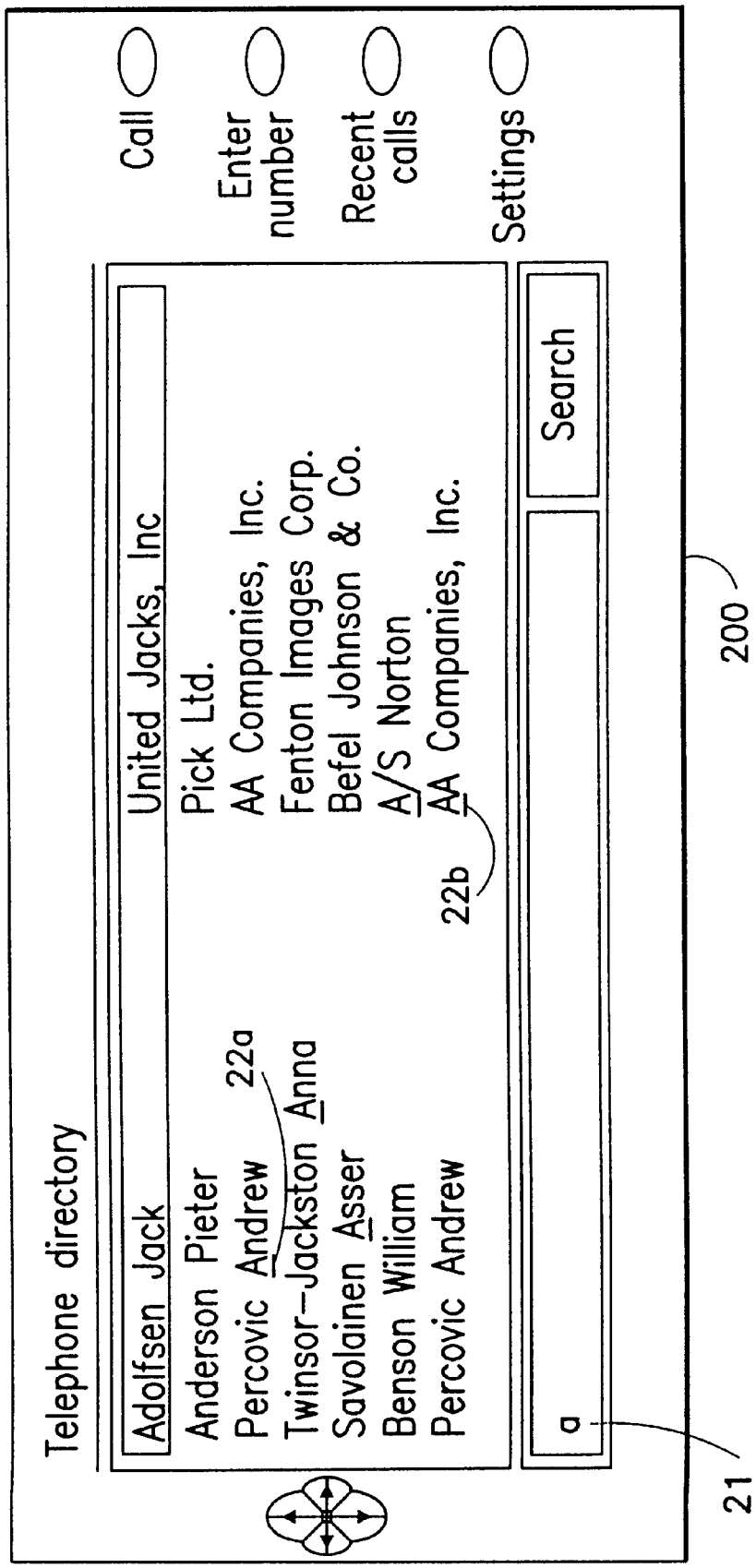

Referring to FIG. 4A and FIG. 4B, a search field 4 is used to accept keyboard 8b input of a search key 21 based on one of the displayed fields such as the name field 5 or the company field 6. To search for an item of information, such as a specific name, the name is entered using the keyboard 8b into the search field 4. The search engine 14, comprising a software or firmware search engine, compares fields for matches in the name field 5 or company field 6. The search results can be cleared by deleting characters, one by one, from the search field 4 with the backspace key located on keyboard 8b.

The search is performed on the name field 5 or the company field 6 contained in each contact record 100, although other search fields could be implemented by those persons skilled in the art. A contact may have a multi-part value, such as 'Jones Andrew', wherein the search will be performed on both names (the space character acting as a separator). The same applies to 'Company' or 'Address' or other possible fields. The search can be performed on any number of fields keeping in mind the resources and processor capability.

The result of the query is sorted alphabetically and displayed on display 3 in the following order: sorted, (1) according to the first separate word in the 'Name' field; (2) according to the second separate word in the 'Name' field; (3) according to the third separate word in the 'Name' field; (4) according to the nth separate word in the first 'Name' field; (5) according to the first separate word in the first 'Company' field; (6) according to the second separate word in the first 'Company' field; or (7) according to the nth separate word in the first 'Company' field.

Thereafter depending on the levels of search embodied in the particular PDA 10b, query results are displayed sorted: (1) according to the first separate word in the first 'Address' field; (2) according to the second separate word in the first 'Address' field; (3) according to the third separate word in the first 'Address' field; or (4) according to the nth separate word in the first 'Address' field, etc.

Figure 4C:
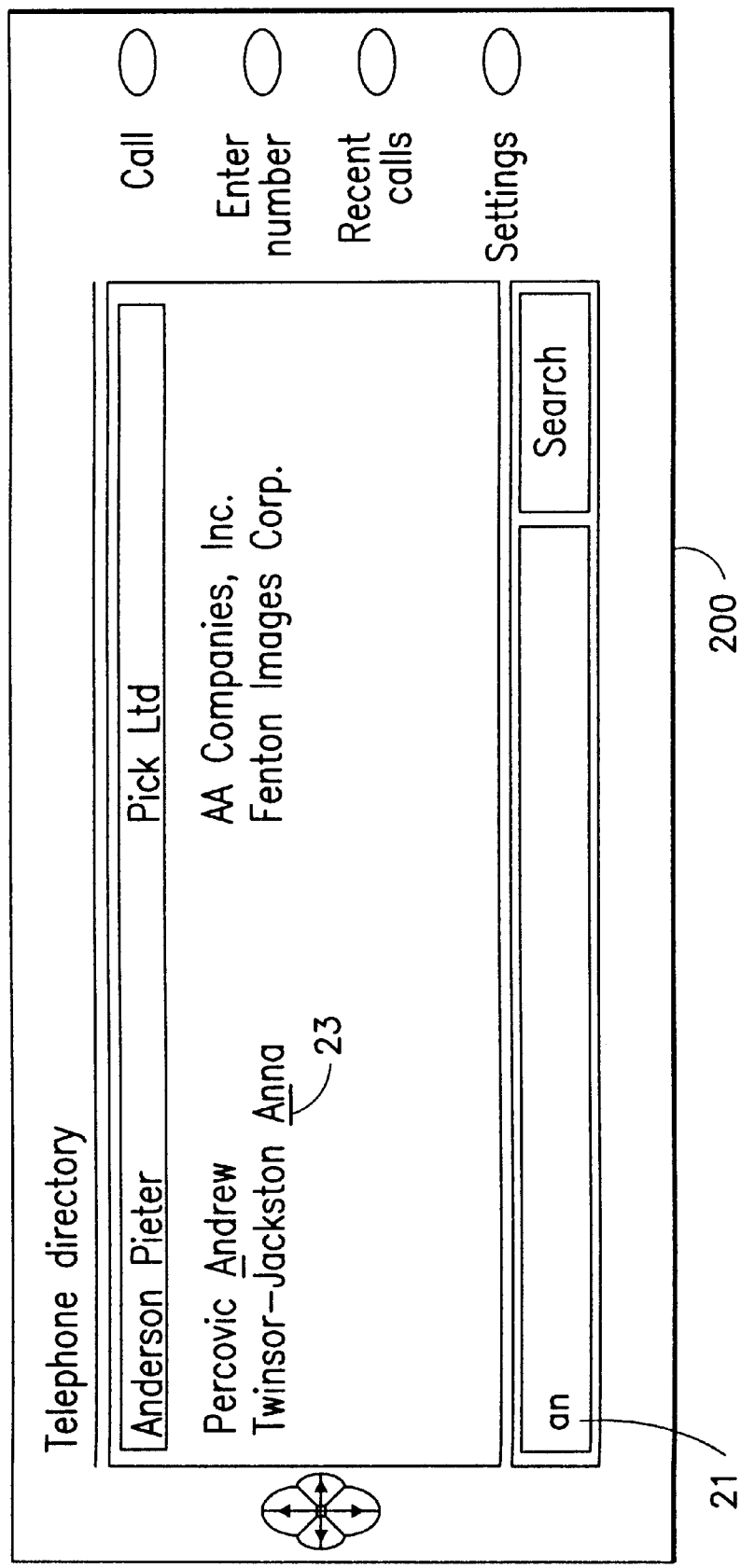
Figure 4D:
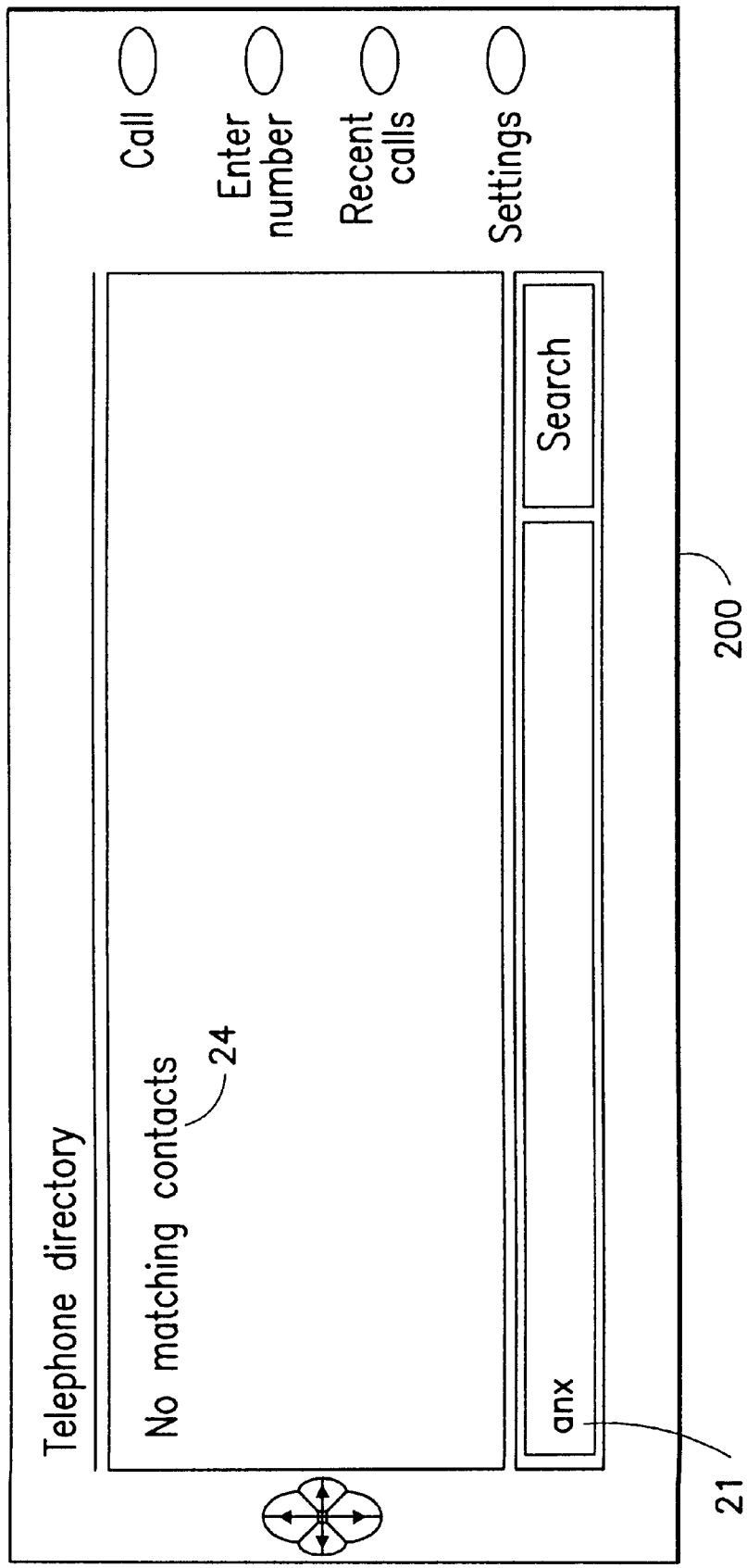

FIG. 4B illustrates a telephone directory 200 where a search character 21 depicted as "a" is provided. Note that all individual names 22a, such as Andrew and the company names 22b, such as AA Companies, Inc., beginning with the letter "a" are matched and thereby retrieved in the search and displayed at one time. FIG. 4C illustrates a search on the characters 21 depicted as "an" and FIG. 4D illustrates no matching contacts when the characters 21 depicted as "anx" are searched.

Figure 5A:
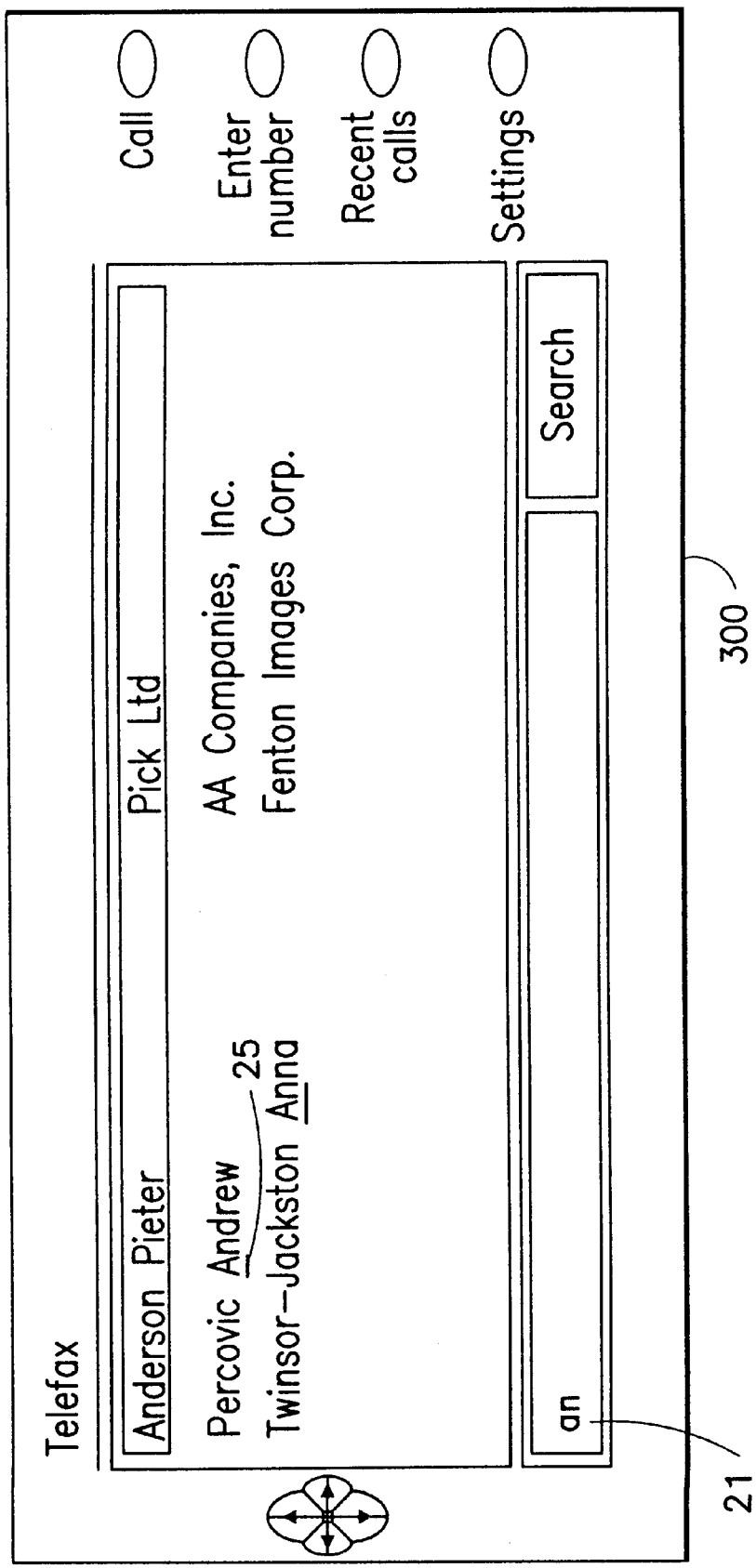
FIGS. 5A–5B illustrate various displays of the auxiliary directories.
Figure 5B:
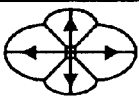

FIG. 5A and FIG. 5B are further examples of other applications utilizing the same contact data base 18. The telefax directory 300 illustrated does not have any telefax numbers at the time of the search, but it will nevertheless be displayed to the user because the search key 21 depicted as "an" shows a match. However, as shown in FIG. 5B, two of the contacts 28 do not have an E-mail address, but each will be visible to the user on the display 3 at a reduced illumination level, dimmed, or otherwise visually distinguished.

A World Wide Web (WWW) link may also be provided in a contact card 100. By example, by providing a WWW field, e.g. WWW(Homepage):http://www.myserver.net/myhomepage.htm, a user may initiate a data call to an internet access point and automatically retrieve (load, fetch) the page stored in that field, http://www.myserver.net/myhomepage.htm. A gopher link can be provided as well, and/or a FTP (file transfer protocol) link.

Referring again to FIG. 2B, the user chooses a message content application such as the E-mail application or the facsimile application by pressing one of the application keys 9. For example, in the case where an E-mail is to be sent, depressing the Internet key of the application keys 9 produces on display 3 an instruction to the user to type the E-mail information or message content. The user will then type the message content using keyboard 8b, which content is displayed on the display 3. When the message content is ready to be sent, the user selects a recipient from the E-mail directory 5B. Recall that the contact data base 11 is also used to select addressees for message content such as facsimiles and E-mails as well as to route the electronic communications or telephone calls. The user can then send the E-mail immediately or can delay the sending to a later time, in either case using the same contact data base 11 to acquire the E-mail address. If the sending is delayed the PDA 10b creates a temporary file to store the E-mail, where it will be later retrieved, when the user desires to send the message.

An alternate method for operating the PDA 1 comprises the steps of: storing in the data base 11 one or more records of names and relatable calling numbers comprising a directory; choosing an application using the application keys 9 to input either a facsimile or E-mail content as described above; selecting a record from either the facsimile directory 300 or E-mail directory 400 and then utilizing the information in the selected record to address the facsimile or E-mail.

Figure 6A:
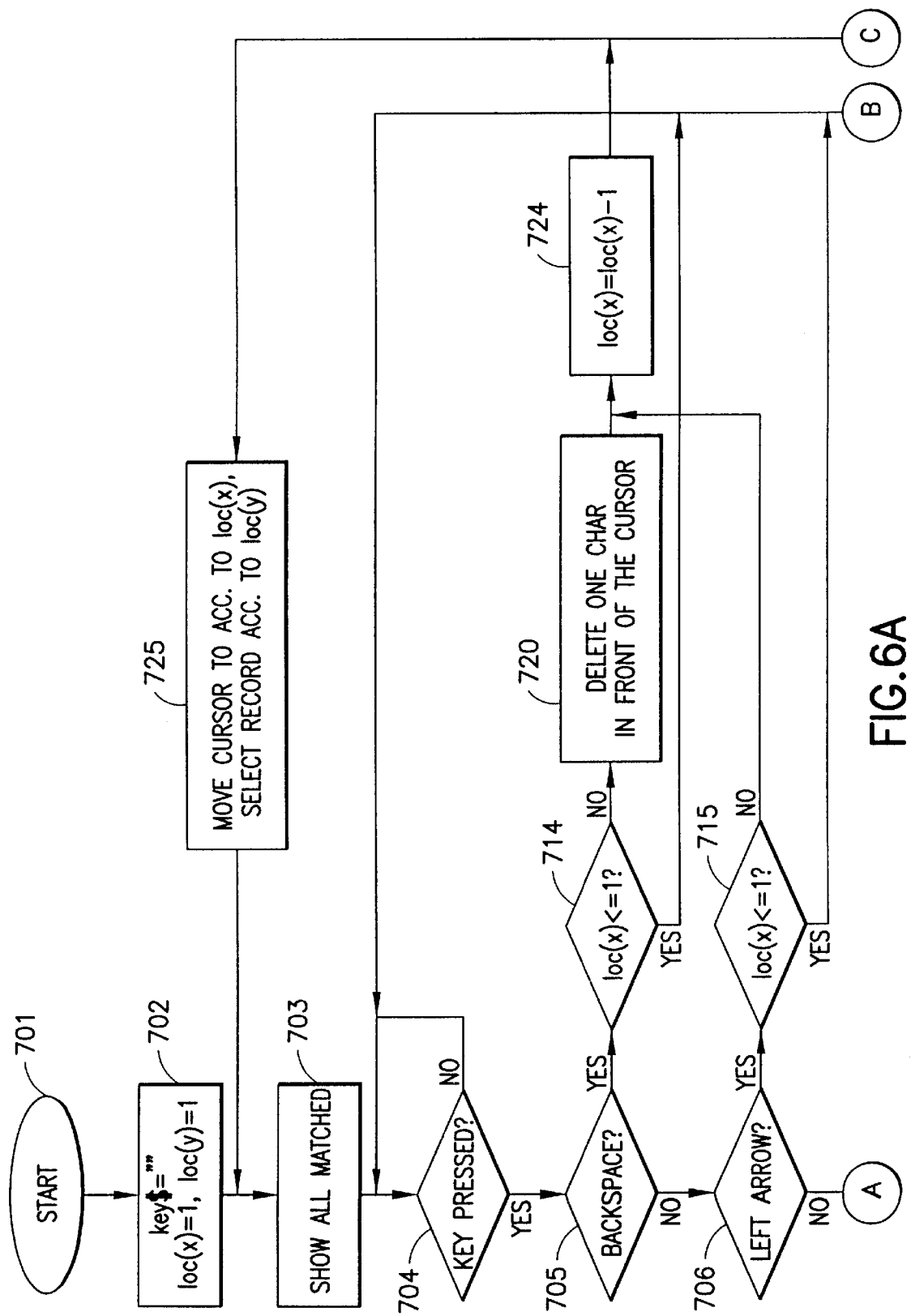
FIGS. 6A and 6B are a flowchart detailing the sequence following a command to perform a search.
Figure 6B:
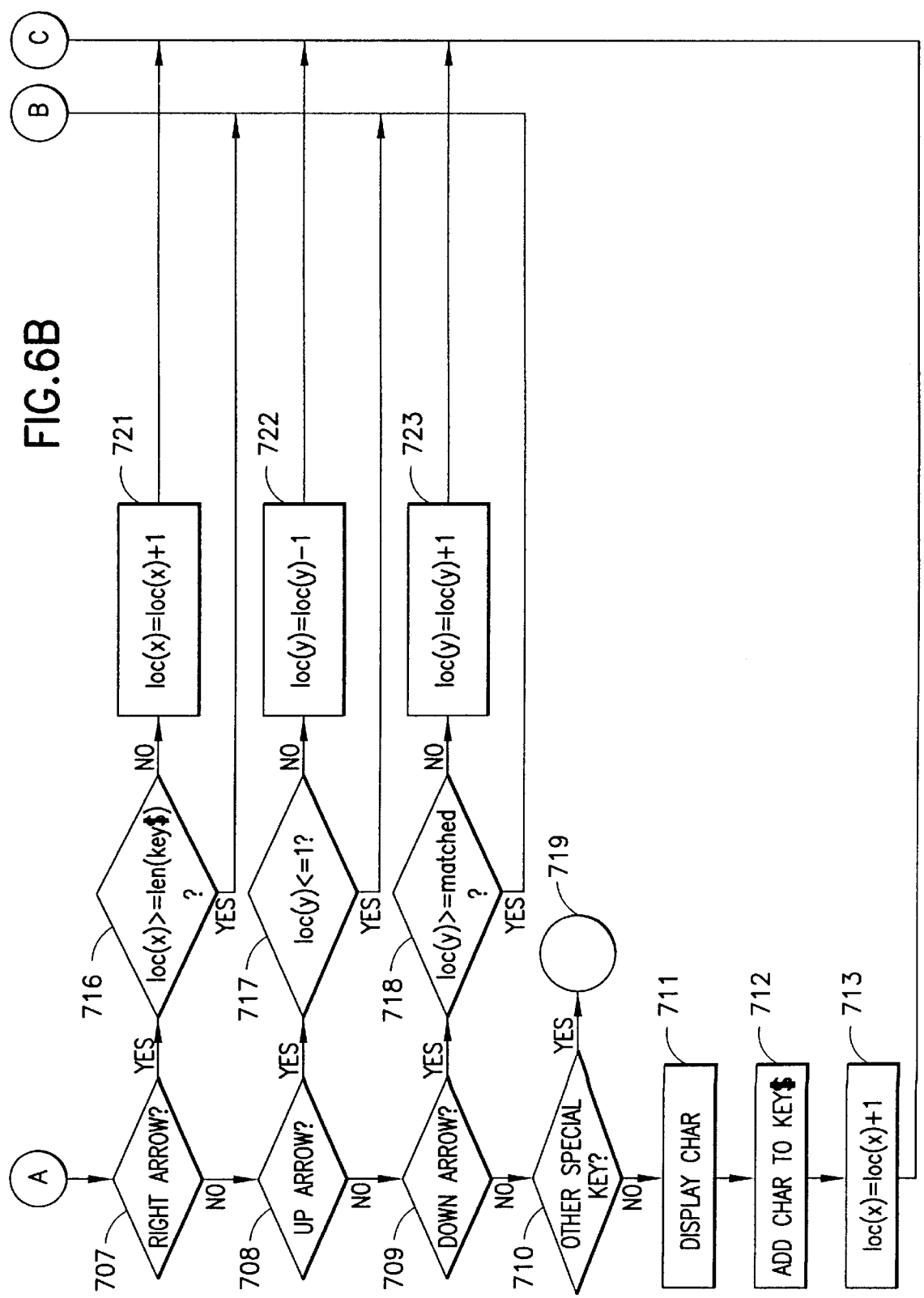

FIGS. 6A and 6B are a flowchart detailing the sequence following the command to perform a search. This flowchart accepts the user actions and forwards user input to the search subroutine.

The search process begins at Block 701 with the user choosing a name to search for purposes of making a call or sending a telefax or E-mail. Search variables 702 are set by designating search key 21 symbolically as Key$, the alphanumeric string representing the selected name, provided by user input, through the keyboard 8b and appearing at the search field 4. For illustration purposes, cursor 104 defines variable loc(x), located within the search field 4. Alternatively the location of the cursor may be replaced by any indicator on a display, so long as it can be denoted by a cursor, pointing device or contact such as touch. The selection frame 105 defines the variable loc(y) in the input field and initially is set to one so that the currently active record will be the first record searched.

A reentrant subroutine 703, FIGS. 7A and 7B, to be described below, is called transferring the variable Key$ to the subroutine as a parameter. When the process is first called, the variable Key$ is designated as a NULL string, indicating that every match should be matched and therefore displayed.

At decision Block 704, the keyboard 8b is tested for whether a key has been depressed. If a key has been depressed, control is forwarded, conditionally, to decision Blocks 705, 706, 707, 708, 709 and 710 for determination of which navigation key 2b or other key on keyboard 8b may have been depressed. In the case where no key has been depressed, the PDA 10b processor continues to test for the depression of a key on the keyboard 8b.

Block 705 tests the condition whether the user has depressed one of the group of navigation keys 2b, referred to as the 'backspace' key and if the condition is satisfied, logical control is forwarded to Block 714. At Block 714, unless the cursor 104 is at the beginning of the line, it deletes the character left of the cursor 104 in the search key 21 string and then moves the cursor 104 left one place. IF the condition has not been satisfied then control is passed to Block 706 for further checking.

Block 706 tests the condition whether the user depressed one of the group of navigation keys 2b, referred to as the 'left arrow' key, and if the condition is satisfied, logical control is forwarded to Block 715. Unless the cursor 104 is at the beginning of the line, the cursor 104 is moved left one place, otherwise it is left unchanged. If the condition has not been satisfied, then control is passed to Block 707 for further checking.

Block 707 tests the condition whether the user depressed one of the group of navigation keys 2b, referred to as the 'right arrow' key, and if the condition is satisfied, logical control is forwarded to Block 716. Unless the location of the cursor 104 is at the right end of the search key 21, the cursor 104 is moved one place to the right, otherwise it is left unchanged. If the condition had not been satisfied then control is passed to Block 708 for further checking.

Block 708 tests the condition whether the user depressed one of the group of navigation keys 2b, referred to as the 'up arrow' key, and if the condition is satisfied, logical control is forwarded to Block 717. Unless the line is already the first line, the selection frame 105 is moved one line up, otherwise it is left unchanged. If the condition had not been satisfied then control is passed to Block 709 for further checking.

Block 709 tests the condition whether the user depressed one of the group of navigation keys 2b, referred to as the 'down arrow' key, and if the condition is satisfied, logical control is forwarded to Block 718. Unless the selection frame 105 is at the last line, the selection frame 105 is moved one line down, otherwise it is left unchanged. If the condition has not been satisfied, then control is passed to Block 710 for further checking.

Block 710 tests the condition whether the user has depressed a special key, e.g. a key assigned to switch applications. If the condition is satisfied, then control is passed to Block 719 to exit the search routine 703 and return to the application prior to activation of the search, otherwise control is passed to Block 711 where the character depressed is displayed. Through Block 712 the character is also added to the search key 21 and then placed in front of the cursor. The cursor 104 location and thereby loc(x), is advanced and the process of searching the contact data base 18 begins again.

Figure 7A:
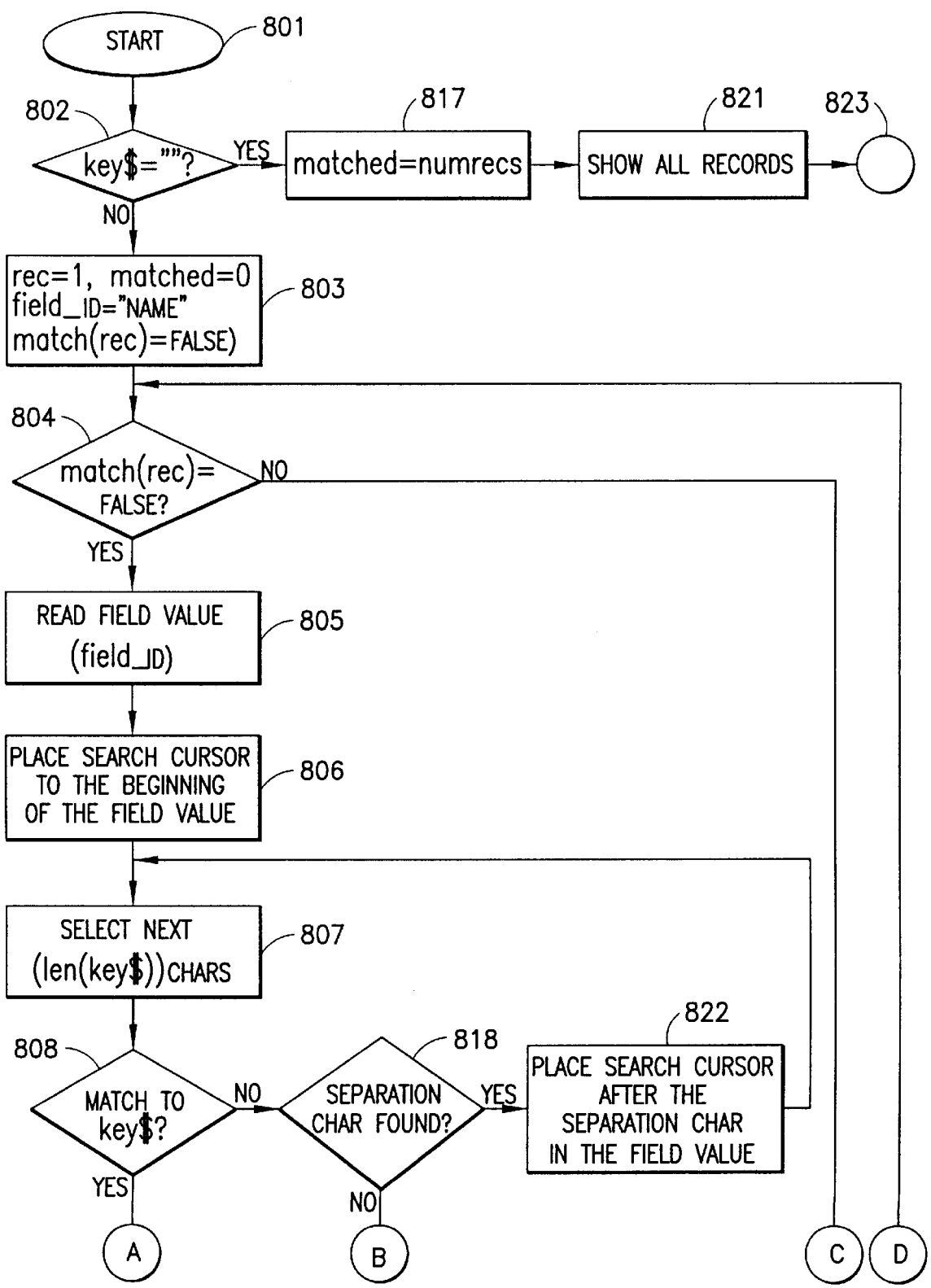
FIGS. 7A and 7B are a flowchart detailing a search engine sequence performed according to a user request to search based on a search key input.
Figure 7B:
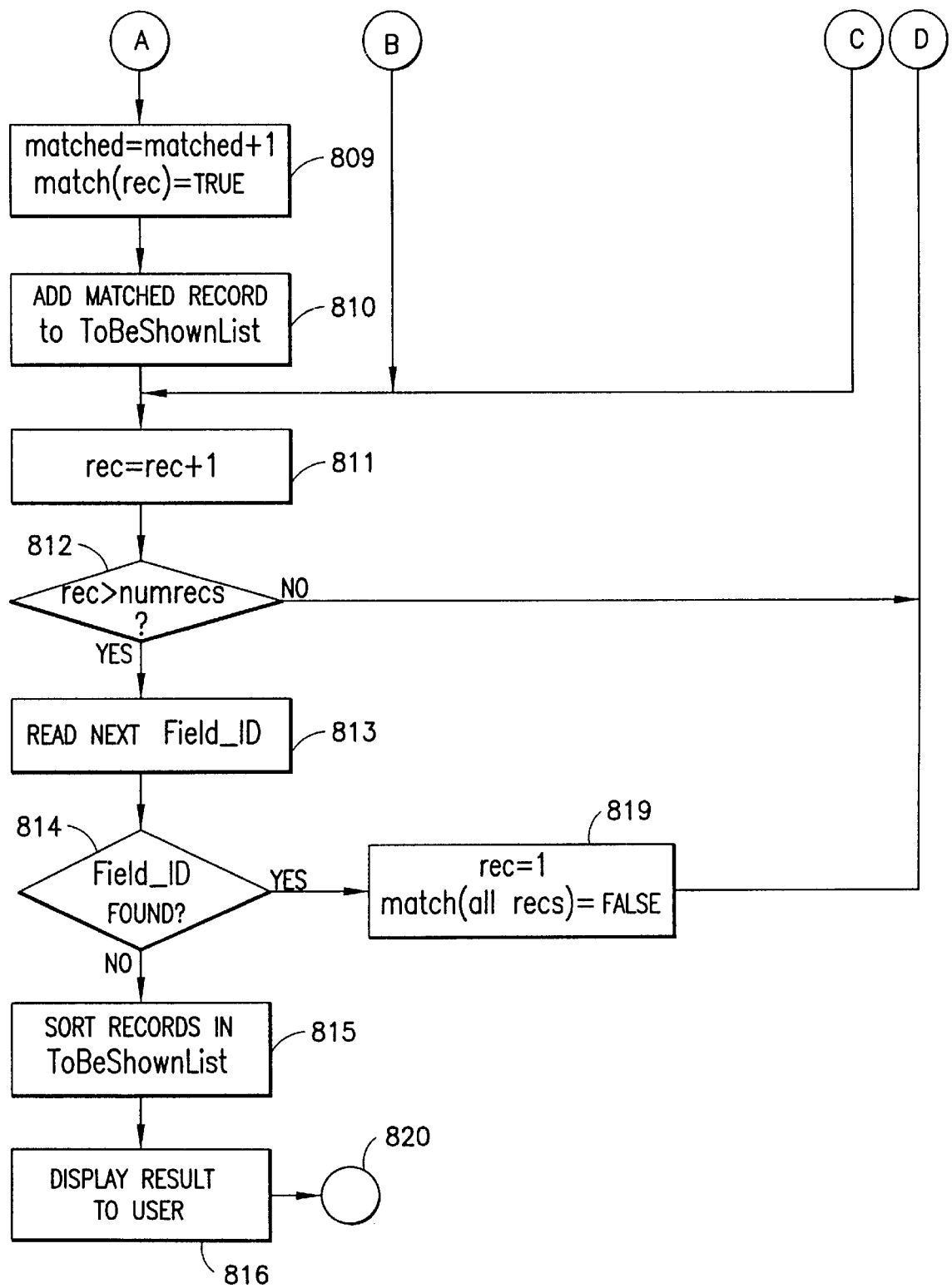

FIGS. 7A and 7B are a flowchart detailing how the search engine searches in accordance with the present invention. In summary the search process comprises the following steps: inputting a search key representing the alphanumeric string to be searched; setting a first variable to the number of records to be checked; setting a first index to one to keep account of the records checked; setting a second variable to the alphanumeric string to be searched; setting a third variable to TRUE if the record has been checked otherwise setting the third variable to FALSE, and if the third variable is FALSE then reading the second variable from the record; comparing the condition whether the search key matches the second variable stored in the record, and if it is determined that the search key matches the second variable, then, the record is displayed; incrementing the first index and determining whether the first index equals the first variable number of records to be checked, and if the first index does not equal the first variable, then the search process repeats until all records matching the search key are displayed.

In describing the search function in detail we begin at Block 801 when the subroutine 703 is called from the process described in FIGS. 6A and 6B and is passed search key 21 parameter Key$, the alphanumeric string representing the selected name, address, or other pertinent data to be searched. In Block 802 if the search criteria is determined to be a null string, then the search is effectively aborted by setting the variable "matched" to the total number of records in the data base, making them available at the display 3 and exiting the search routine 703. As no search key has been provided, all records will be shown.

At Block 817 the variable "matched" is set to the number of all records in the database 18 which variable value is then passed to Block 718 in FIG. 6.

If the string to be compared with records in the database 18 and thereby searched is not the null string, then the process is passed to Block 803.

At Block 803 an index "record" is set to one and the index "matched" is set to zero. The variable "field ID" is set to Name and the variable "Match(record)" is initially set to FALSE. This causes the condition at Block 804 to be satisfied, which in turn reads the field value from the active record in Block 805.

Block 804 determines if a record should be compared based on whether the current record has already been checked. If "match(record)=TRUE", then the current record is skipped and the process jumps to Block 811 where the "record" index is incremented by one, otherwise Block 805 reads the field value according to the variable "field ID" from the active record.

Block 806 effectively places the cursor 104 at the beginning of the field value in order to set the start point of the field to be checked.

Block 807 first calculates the length of the search key 21, symbolically Key$, and then selects, starting from the current search position, the next character according to the length of search key 21.

Block 808 tests the condition whether the selected string compares or matches the value stored in the search key 21, symbolically Key$, and if it is determined that it does compare, then, the process moves to Block 809, otherwise the process moves to Block 818.

A separation character is a pre-defined character intended to separate words in the field value location. Characters such as quotes or hyphens as in "Adolfsen Jack" or "Twinsor-Jockston" are permissible. If a separation character is found, then the match comparison is performed on the search string following the separation character. If it is determined that the character is not a separation character, then the record is determined not to be a match and the process advances to the next record.

If the test in Block 808 determines a match between the search key 21 and a field value, then Block 809 increments the index "matched" by one, sets the variable "match (record)" to TRUE (preventing the record from being searched again), and passes the process to Block 810 where the favorably compared record is added to a temporary list labeled "ToBeShownList".

Depending on limitations imposed by available memory, memory configurations, or hardware, several temporary "ToBeShownList" lists can co-exist. This has the advantage that several files can be created if the data base, which may contain hundreds of matched records, does not fit in one temporary list. When more than one ToBeShownList exists, subsequent searches can be performed from existing temporary lists instead of the contact data base 18. This typically results in efficiencies of search speed. For example, consider that a search has previously been processed on the letter "A" and a ToBeShownList has compiled all records that have an "A" in the 'Name' field. Subsequently, if the user types in a search key "As", the search only need be conducted on the previously compiled ToBeShownList, not the entire contacts data base 18. Although, the embodiment illustrating this technique is not shown in the FIG. 7 flowchart, it will be understood as easily implemented by persons skilled in the arts, based on the foregoing description.

At Block 811 the index "record" is incremented by one so as to point to the next record to be checked. However, before another record is retrieved, Block 812 tests the index "record" against the number of records in the data base represented by the variable "numrecords". If the index "record" is less than "numrecords" then the next record in the data base 18 is checked.

After all records have been checked for a match in the first field ID 5, then the process determines if another field such as field ID 6 needs to be searched, also, Block 813 reads the next field ID to determine if the next field, within a record, is to be compared for a match. IF there is no other field to be compared to the search string, then the index "record" is reset to one, the variable "match(records)" is reset FALSE, and the process beginning at Block 804 is repeated on the new field.

If no additional fields are to be compared against the search key 21, then the Block 814 passes control to Block 815 to combine any temporary lists created. Thereafter, the sorted lists are displayed as shown by Block 816. If no matches were found the system displays the message that no matches were found. Block 820 returns the control to the calling routine 703.

Further, in accordance with this invention, a telephone number obtained from the above-described search procedure can be transferred to the telephone 12 shown in FIG. 2A, thereby enabling a call to be placed to the desired party. The number is transferred to the internal data bus of the telephone 12 using a format and protocol that is compatible with the internal data bus.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. A method for operating a personal digital assistant having an input means, a file storage means, a data base, a search engine means, a display means, and an electronic communication means, comprising the steps of:

storing in the data base one or more records, each of the records comprising data elements defining an identifier of a party and communication information required for communicating with the party through a communication link;

in response to an input from a user, selecting one of a plurality of directories, each of said directories comprising one or more entries and being related to a respective type of communication, each of said entries corresponding to at least one of said data elements of one of said records;

in response to the selecting step, displaying each of the one or more entries of the selected directory;

inputting a search key corresponding to at least a portion of at least one of the displayed entries of the selected directory;

comparing the search key to at least one data element corresponding to at least one of the displayed entries and further displaying those ones of the entries which correspond to data elements corresponding to the search key; and in response to another input by the user, selecting one of the further displayed entries for initiating a communication to a party, the party being identified by the identifier defined by data elements corresponding to the selected entry.

2. The method as described in claim 1, wherein the step of comparing the search key comprises the steps of:

setting a value of a first variable equal to a number representing a total number of the records to be searched;

setting a value of a second, index variable equal to one;

reading at least one of the data elements of a record corresponding to the value of the second, index variable;

determining whether the search key matches at least one of the data elements of the record corresponding to the value of the second, index variable; and incrementing the value of the second, index variable by one and subsequently determining whether the value of the second, index variable equals the value of the first variable, and if the value of the second, index variable does not equal the value of the first variable, then the steps of reading, determining, incrementing, and subsequently determining are again performed until it is determined that the value of the second, index variable equals the value of the first variable.

3. A method as described in claim 1, wherein the step of selecting one of the further displayed entries is performed in accordance with the location of an indicator on the display means, denoted by at least one of a cursor, a pointing device or a contact and a selection frame in the display means.

4. A method as described in claim 1, wherein prior to the step of inputting the search key, a step is performed of inputting a message into the personal digital assistant through the input means, and wherein the communication initiated in the step of selecting one of the further displayed entries communicates the inputted message to the party identified by the identifier defined by data elements corresponding to the selected entry.

5. A method as described in claim 1, wherein the communication initiated in the step of selecting one of the further displayed entries is of the type of communication related to the selected directory.

6. A method as described in claim 1, wherein the communication information includes at least one of a telephone number, facsimile number, E-mail address, paging address, and an Internet address.

7. A method as described in claim 1, wherein the respective type of communication includes at least one of a telephony communication, a facsimile communication, an E-mail communication, a paging communication, and an Internet communication.

8. A method as described in claim 1, wherein the plurality of directories include at least two of a telephone number directory, a facsimile number directory, an E-mail address directory, a paging number directory, and an Internet address directory.

9. A method as described in claim 1, wherein the step of further displaying is performed in such a manner that those ones of the entries which correspond to data elements defining communication information that corresponds to the type of communication related to the selected directory are visually distinguished from those ones of the entries which correspond to data elements defining communication information that is not related to the type of communication related to the selected directory.

10. A method for operating a personal digital assistant having an input means, a file storage means, a data base, a search engine means, a display means, and an electronic communications means, comprising the steps of:

storing in the data base one or more records, each of the records comprising identification information identifying a party and communication information required for communicating with the party through a communication link;

in response to an input from a user, selecting one of a plurality of directories, each of said directories comprising one or more entries and being related to a respective type of communication, each of said one or more entries corresponding to a respective one of said records;

inputting a message into the personal digital assistant through the input means; and in response to a selection by the user, associating the inputted message with a selected one of the entries of the selected directory, wherein the communication information of the record corresponding to the selected entry is assigned to the inputted message for subsequently communicating to a party the inputted message using the type of communication corresponding to the selected directory, said party being identified by the identification information of the record corresponding to the selected entry.

11. A method as described in claim 10, wherein the step of selecting one of the entries is performed in accordance with the location of an indicator on the display means, denoted by at least one of a cursor, a pointing device or a contact and a selection frame in the display means.

12. A method as described in claim 10, wherein the communication information includes at least one of a telephone number, facsimile number, E-mail address, paging address, and an Internet address.

13. A method as described in claim 10, wherein the plurality of directories include at least two of a telephone number directory, a facsimile number directory, an E-mail address directory, a paging number directory, and an Internet address directory.

14. A method as described in claim 10, wherein the respective type of communication includes at least one of a telephony communication, a facsimile communication, an E-mail communication, a paging communication, and an Internet communication.

15. The method as described in claim 10, wherein a further step is performed of communicating the inputted message to said party identified by the identification information of the record corresponding to the selected entry, said communicating step being performed using the type of communication related to the selected directory.

16. The method as described in claim 15, wherein prior to the step of communicating, a step is performed of storing at least the inputted message, and wherein the step of communicating is performed in response to a user inputting information into the personal digital assistant specifying that the inputted message be communicated.

17. A personal digital assistant device comprising:

a storage means having a data base for storing one or more records, each of the records comprising data elements defining an identifier of a party and communication information required for communicating with the party through an electronic communication link;

a first user input means, said first user input means being operable by a user for inputting a search key corresponding to at least one of the data elements of at least one of said records;

a search engine for comparing at least one of the data elements of at least one of the records to the search key;

a display for displaying at least a portion of those ones of said records having at least one data element corresponding to the search key;

a second user input means, said second user input means being operable by the user for selecting one of the records having at least one data element corresponding to the search key; and electronic communication means for initiating an electronic communication to the party identified by the identifier defined by data elements of the selected record, using one of a plurality of types of electronic communication.

18. A personal digital assistant device as set forth in claim 17, wherein the plurality of types of electronic communication include at least two of a telephony communication, a facsimile communication, an E-mail communication, a paging communication, and an Internet communication.

19. A personal digital assistant as set forth in claim 17, wherein the communication information includes at least one of a telephone number, facsimile number, E-mail address, paging address, and an Internet address.

20. The personal digital assistant device as in claim 17, wherein at least one of the first and second user input means is comprised of a QWERTY keyboard.

21. The personal digital assistant device as in claim 17, wherein at least one of the first and second user input means is comprised of a telephone keypad.

22. The personal digital assistant device as in claim 17, wherein at least one of the first and second user input means is comprised of a user touch-sensitive screen.

23. The personal digital assistant device as in claim 17, wherein at least one of the first and second user input means is comprised of a voice recognition means.

24. The personal digital assistant device as in claim 17, wherein the communication information includes at least one of a telephone number, a facsimile number, an E-mail address, a paging address, and an Internet address.

25. A personal digital assistant, comprising:

means for storing one or more records, each of the records comprising data elements defining an identifier of a party and communication information required for communicating with the party through a communication link;

communication means;

input means;

a display;

control means coupled to said input means, said display, said communication means, and to said storage means, said control means being responsive to receiving from said input means user-input information specifying that a first one of a plurality of directories be selected for retrieving from said storage means at least a portion of those ones of said records corresponding to said first directory and for controlling the display so as to present the retrieved portions of these records to the user as corresponding directory entries, said control means also being responsive to receiving from said input means a user-input search key for comparing the user-input search key to at least one of the data elements of at least one of said records from said storage means, for retrieving from said storage means at least a portion of those ones of said records having data elements corresponding to the user-input search key, and for controlling the display so as to display as further directory entries the retrieved portions of said records having data elements corresponding to the user-input search key, said control means also being responsive to receiving from said input means user-input information specifying that one of the further displayed directory entries be selected for controlling said communication means so as to initiate a communication to the party identified by the identifier defined by data elements corresponding to the user-selected directory entry.

26. A personal digital assistant as set forth in claim 25, wherein the communication information includes at least one of a telephone number, facsimile number, E-mail address, paging address, and an Internet address.

27. A method as described in claim 25, wherein the plurality of directories include at least two of a telephone number directory, a facsimile number directory, an E-mail address directory, a paging number directory, and an Internet address directory.

28. A method as described in claim 25, wherein the communications means includes a telephone unit.

29. A method for operating a personal digital assistant having an input means, a file storage means, a data base, a search engine means, a display means, and an electronic communication means, comprising the steps of:

storing in the data base one or more records, each of the records comprising data elements defining an identifier of a party and communication information required for communicating with the party through a communication link;

in response to a directory selecting input from a user, selecting one of a plurality of user selectable directories, each of said directories comprising one or more entries and being related to a respective type of communication, each of said entries corresponding to at least one of said data elements of one of said records;

in response to the selecting step, displaying each of the one or more entries of the selected directory;

inputting a search key corresponding to at least a portion of at least one of the displayed entries of the selected directory;

comparing the search key to at least one data element corresponding to at least one of the displayed entries and further displaying those ones of the entries which correspond to data elements corresponding to the search key; and in response to another input by the user, selecting one of the further displayed entries for initiating a communication to a party, the party being identified by the identifier defined by data elements corresponding to the selected entry.

* * * * *

(12) EX PARTE REEXAMINATION CERTIFICATE (10536th)
United States Patent
Siitonen et al.

(10) Number: US 6,049,796 C1
(45) Certificate Issued: Mar. 16, 2015

(54) PERSONAL DIGITAL ASSISTANT WITH REAL SEARCH CAPABILITY

(75) Inventors: Lasse Siitonen, Jankanraitti (FI); Risto Ronkka, Koulukatu (FI)

(73) Assignee: Mobilemedia Ideas LLC, Chevy Chase, MD (US)

Reexamination Request:
No. 90/012,080, Jan. 6, 2012

Reexamination Certificate for:
Patent No.: 6,049,796
Issued: Apr. 11, 2000
Appl. No.: 08/803,814
Filed: Feb. 24, 1997

(51) Int. Cl.
*G06F 7/00* (2006.01)
*G06F 17/30* (2006.01)

(52) U.S. Cl.
CPC ....... *G06F 17/30864* (2013.01); *Y10S 707/922* (2013.01); *Y10S 707/99933* (2013.01); *Y10S 707/99934* (2013.01); *Y10S 707/99935* (2013.01); *Y10S 707/99943* (2013.01)
USPC ........... 707/711; 707/712; 707/769; 707/812; 707/922; 707/999.003; 707/999.004; 707/999.005; 707/999.102

(58) Field of Classification Search
None
See application file for complete search history.

(56) References Cited

To view the complete listing of prior art documents cited during the proceeding for Reexamination Control Number 90/012,080, please refer to the USPTO's public Patent Application Information Retrieval (PAIR) system under the Display References tab.

*Primary Examiner* — Joseph R Pokrzywa

(57) ABSTRACT

The present invention is a method and an apparatus for searching a personal digital assistant (PDA) data base utilizing a search criteria and displaying the result so that the user can determine whether the search yielded the intended result, whether the search needs to be refined, or whether the outcome should be used to initiate an electronic communication such as a telephone call. After successfully obtaining the specific name and recipient information, such as a telephone number, telefax number, numbers for an Internet server and related E-mail address, the numbers may be applied to a telephone for establishing a PSTN or telephone connection. Thereafter the PDA, utilizing the telephone unit links the user to a line or employs data transmission capabilities of a wireless network to send telefaxes, short messages, E-mail and to connect with remote computers. Using a keyboard the user can store data in a data base, alter the data base and input search criteria. The directory is similar in appearance to a telephone book listing where the information comprises at least a name and telephone number or address associated with a particular field in a data base record. Because names are primarily what interests the personal digital assistant users, searches based on the name field typically yields related phone numbers and other record data, although the user is not precluded from searching on other types of information.

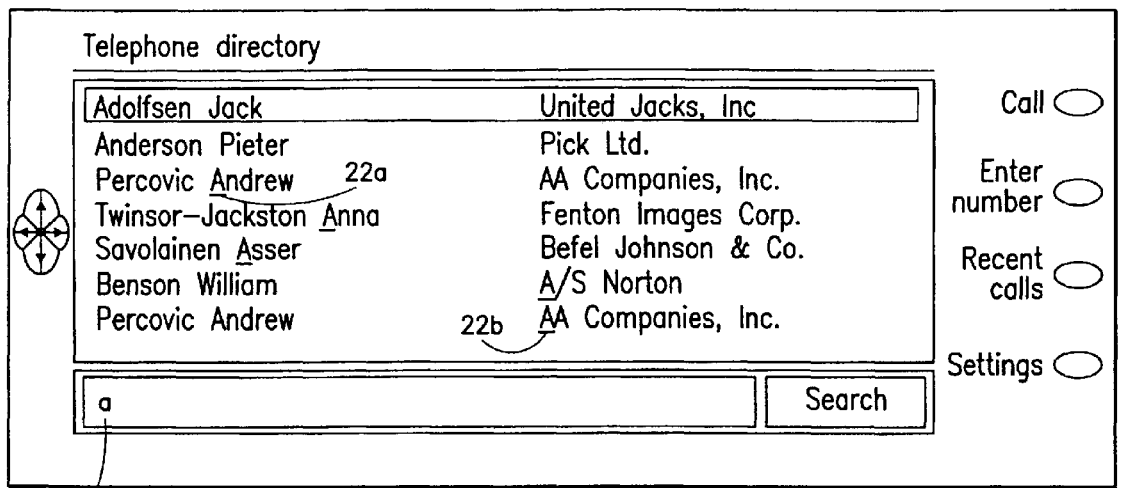

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3-29 are cancelled.

Claim 2 is determined to be patentable as amended.

2. [The method as described in claim 1,] *A method for operating a personal digital assistant having an input means, a file storage means, a data base, a search engine means, a display means, and an electronic communication means, comprising the steps of:*

*storing in the data base one or more records, each of the records comprising data elements defining an identifier of a party and communication information required for communicating with the party through a communication link;*

*in response to an input from a user, selecting one of a plurality of directories, each of said directories comprising one or more entries and being related to a respective type of communication, each of said entries corresponding to at least one of said data elements of one of said records;*

*in response to the selecting step, displaying each of the one or more entries of the selected directory;*

*inputting a search key corresponding to at least a portion of at least one of the displayed entries of the selected directory;*

*comparing the search key to at least one date element corresponding to at least one of the displayed entries and further displaying those ones of the entries which correspond to data elements corresponding to the search key; and*

*in response to another input by the user, selecting one of the further displayed entries for initiating a communication to a party, the party being identified by the identifier defined by data elements corresponding to the selected entry,* wherein the step of comparing the search key comprises the steps of:

setting a value of a first variable equal to a number representing a total number of the records to be searched;

setting a value of a second, index variable equal to one;

reading at least one of the data elements of a record corresponding to the value of the second, index variable;

determining whether the search key matches at least one of the data elements of the record corresponding to the value of the second, index variable; and incrementing the value of the second, index variable by one and subsequently determining whether the value of the second, index variable equals the value of the first variable, and if the value of the second, index variable does not equal the value of the first variable, then the steps of reading, determining, incrementing, and subsequently determining are again performed until it is determined that the value of the second, index variable equals the value of the first variable.

* * * * *